Figure 1:
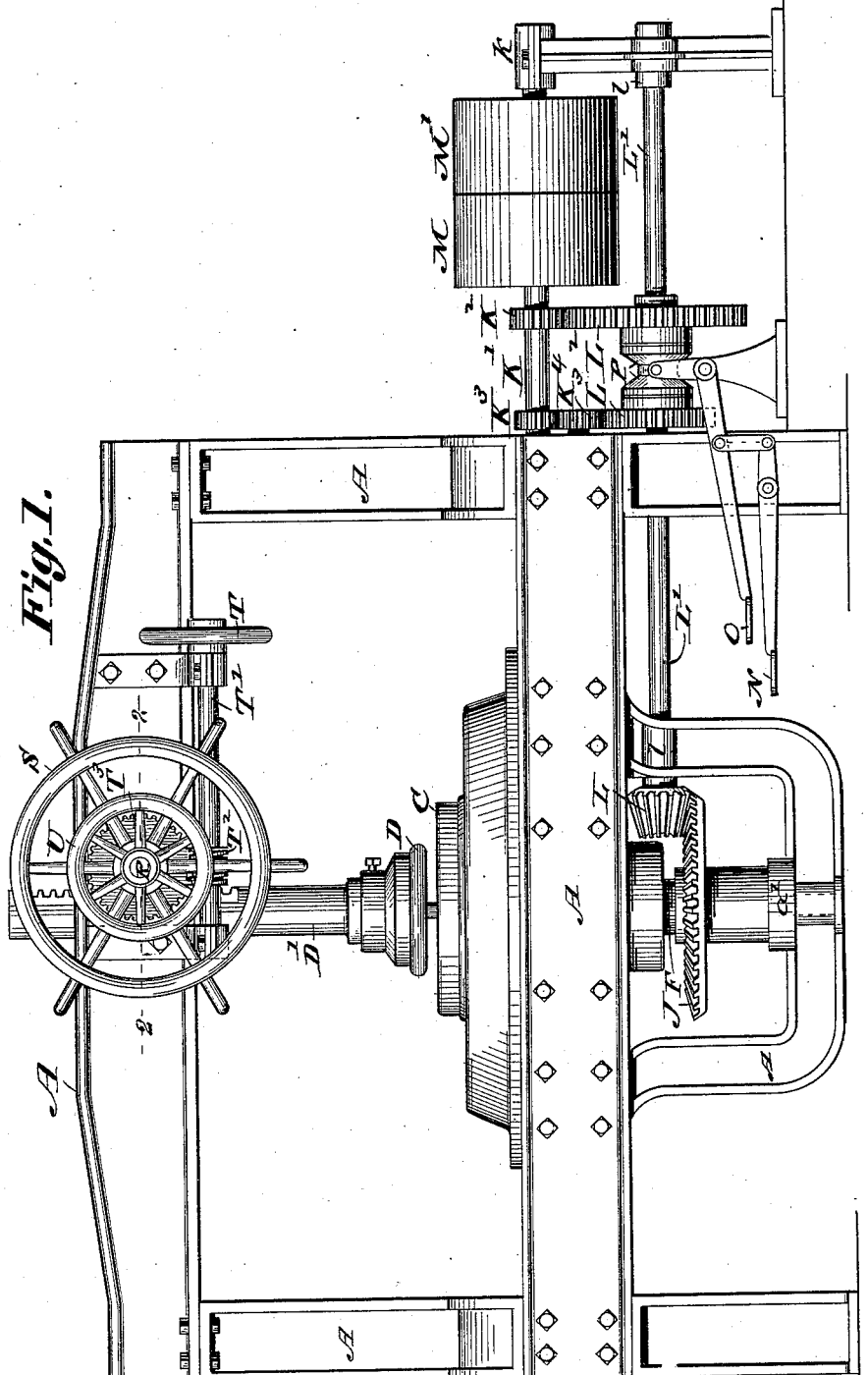

(No Model.)  2 Sheets—Sheet 1.

H. W. SHEPARD.
FLANGING MACHINE.

No. 304,671.  Patented Sept. 2, 1884.

Attest:
Charles Pickles
Jno. A. Caldwell

Inventor:
Henry W. Shepard
by C. D. Moody atty (No Model.) 2 Sheets—Sheet 2.
H. W. SHEPARD.
FLANGING MACHINE.
No. 304,671. Patented Sept. 2, 1884.
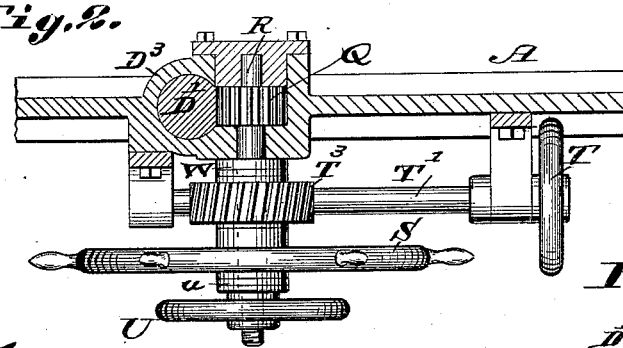
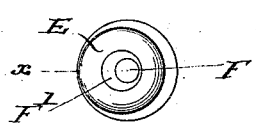
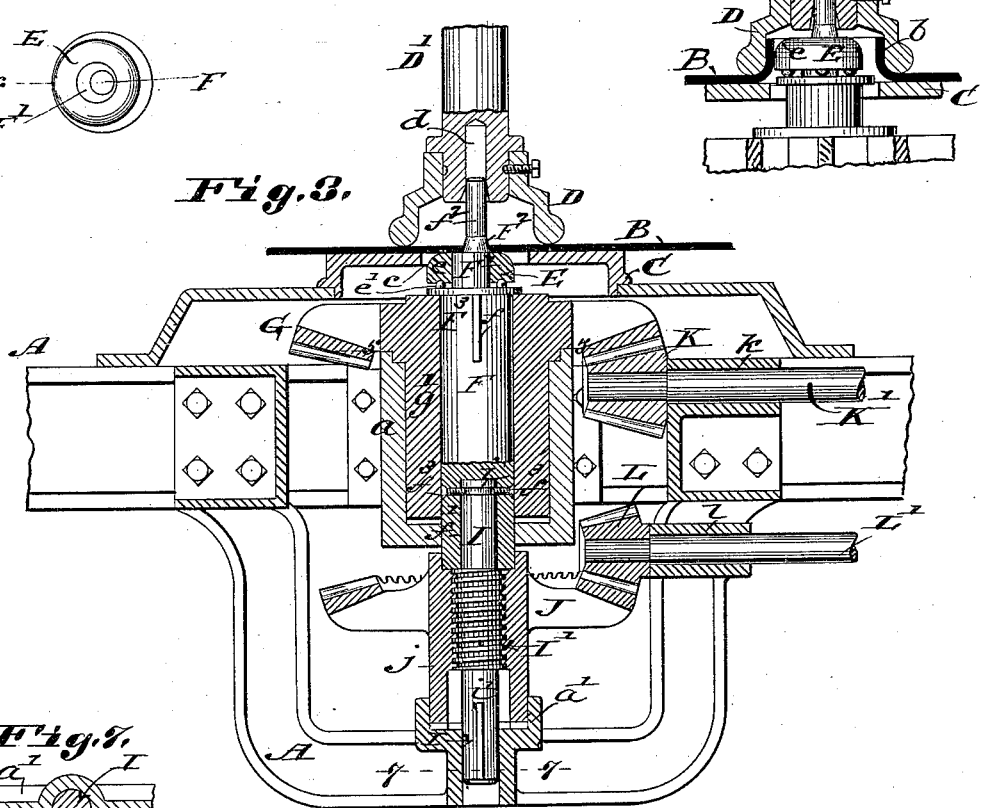
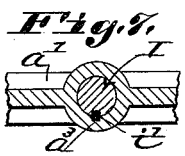
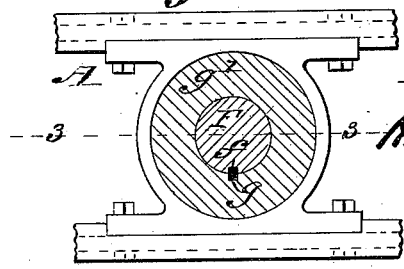
Attest:
Charles Pickles
Jno A Caldwell
Inventor:
Henry W. Shepard
by C D Moody
atty

UNITED STATES PATENT OFFICE.

HENRY W. SHEPARD, OF ST. LOUIS, MISSOURI, ASSIGNOR OF ONE-HALF TO ALBERT B. BOWMAN, OF SAME PLACE.

FLANGING-MACHINE.

SPECIFICATION forming part of Letters Patent No. 304,671, dated September 2, 1884.

Application filed January 8, 1884. (No model.)

*To all whom it may concern:*

Be it known that I, HENRY W. SHEPARD, of St. Louis, Missouri, have made a new and useful Improvement in Flanging-Machines, of which the following is a full, clear, and exact description, reference being had to the annexed drawings, making part of this specification, in which—

Figure 1 is a front elevation of the device; Fig. 2, a horizontal section on the line 2 2 of Fig. 1; Fig. 3, a vertical transverse section on the line 3 3 of Fig. 5; Fig. 4, a top view of the former; Fig. 5, a horizontal section on the line 5 5 of Fig. 3; Fig. 6, a vertical section of the die, and showing the parts as when the former has formed the flange in the die; and Fig. 7, a horizontal section on the line 7 7 of Fig. 3.

The same letters of reference denote the same parts.

This improvement relates, mainly, to the former and the means for operating it. It also has reference to the mechanism for operating the die. A suitable frame, A, supports the operating mechanism. The plate B, Fig. 2, to be flanged, is supported upon the table C, Figs. 1, 3, and is held down thereupon by means of the die D. The former E works upward and downward through the opening $c$ in the table C, as indicated by the two positions shown, respectively, in Figs. 3 and 6. The former is a circular piece, rounded at its upper edge, $e$, and attached at its center to an eccentric-spindle, F. The spindle F in turn is held in and adapted to be rotated with the beveled gear G. The spindle can also be raised and lowered in the gear G. To this end the spindle is provided with a feather, $f$, which engages in a corresponding groove, $g$, in the gear G, as shown in Figs. 3, 5. The hub $g'$ of the gear G is journaled in the bearing $a$ in the frame of the machine. The spindle F, at its lower end, rests upon the worm-shaft I, and the preferable mode of connecting these parts is as shown in Fig. 3, the spindle F having a socket, $f'$, into which the upper end of the shaft I is inserted. The shaft I has a groove, $i$, at its upper end to receive the pins or screws $f^3$, which project so as to engage in the groove $i$, thereby enabling the spindle F to turn, and at the same time keep in engagement with the shaft I. The shaft I is provided with a worm, I', which in turn is in engagement with the gear J. The hub $j$ of the gear J, at its lower end, is stepped in the bearing $a'$ in the frame of the machine, and at its upper end is fitted to the lower end of the spindle F. The step $a'$ is perforated vertically to receive the lower end of the worm-shaft I, as shown in Fig. 3. The shaft I is provided with a feather, $i'$, which engages in a corresponding groove, $a^3$, in the step, as shown in Fig. 7, thereby preventing the shaft I from being rotated, but permitting it to be raised and lowered in the step. The gear G is rotated by means of the gear K upon the shaft K'. The gear J is rotated by means of the gear L upon the shaft L'. The shafts K' L' are held in suitable bearings, K K $l$ $l$, respectively, in the frame of the machine. The power is applied to the shaft K' by means of pulleys M M', in the ordinary manner. The shaft K' is provided with the pinions $K^2$ $K^3$. The shaft L' is provided with the gears $L^2$ $L^3$. The pinion $K^2$ engages with the gear $L^2$, and the intermediate gear, $K^4$, serves to connect the pinion $K^3$ with the gear $L^3$, as shown in Fig. 1.

To operate the machine, the attendant depresses the pedal N, which, through the pedal O, serves to shift the clutch P into engagement with the gear $L^2$, and thereby to connect the gear $L^2$ with the shaft L'. This sets both of the gears G and J in operation. The rotation of the gear G causes the spindle F to rotate, and the rotation of the gear J causes the shaft I to rise and to lift the spindle F. That portion, F', of the spindle F to which the former E is immediately attached is, as stated, an eccentric, as shown in Figs. 3, 4, 6. In consequence, therefore, of the two movements described, the former E is not only forced upward through the perforation $c$ in the table C, but as it is elevated it moves sidewise, in accordance with the revolution of the eccentric F'—that is to say, the upward movement of the former causes the flange $b$ of the plate to be upturned in the die; but as the former rises its entire periphery does not at once press all around against the metal being upturned, but only one point of the periphery at a time is forced against the metal—that is, referring to Fig. 4 for illustration, the point $x$ in the periphery of the former is shown bearing against the metal. This point $x$ is in line with the throw of the eccentric, and as the eccentric F' rotates the point $x$ or bearing of the former upon the metal will shift to keep in line with the throw of the eccentric. The advantages of this mode of forming the flange are that the operation can be very readily and rapidly performed, the former does not wear away as rapidly, and but a single point of the former is in contact with the metal, in consequence of which the metal is less liable to be chilled than when the entire periphery of the former is pressed at once against the metal. To facilitate the action of the former it is upheld by the friction-balls $e'$, Figs. 3, 6. These balls in turn rest upon a plate, $f$, which is upon the upper end of the main part $F^3$ of the spindle F. If the part $F^3$ is made sufficiently large in diameter, the balls $e'$ might rest directly upon it; but the plate $f$ is preferably detachable from the spindle. Both the plate $f$ and the former are grooved to hold the balls $e'$ in place. The die D is attached to the arm D'. This arm is recessed at $d$ to receive an extension, $f^2$, of the spindle F. The engagement of this extension of the spindle in the recess of the arm D' serves to center the former and the spindle and die during the flanging operation, and also to hold the parts properly in place.

The upper end of the arm D' is provided with a rack, $D^2$, Figs. 1, 2. The arm and rack are adapted to work upward and downward through a suitable bearing, $D^3$, in the frame of the machine. The rack is operated by means of the pinion Q, Fig. 2. This pinion is fast upon the shaft R. By means of the wheel S upon the shaft R the shaft can be rapidly rotated, and the arm and die brought readily to a bearing upon the plate being flanged, after which the die can be adjusted more closely, but more slowly, by means of a wheel, T. This wheel is attached to the shaft T', upon which is the worm $T^2$, Fig. 1. This worm engages with the gear $T^3$, which is loose upon the shaft R; but when it is desired to use the gear $T^3$ the nut U is screwed farther onto the shaft R, and thereby made directly or through the collar $u$ to press against the wheel. This wheel S presses against the gear $T^3$, and the gear in turn presses against the stationary washers W. This serves to tighten the gear $T^3$ upon the shaft sufficiently to cause the shaft R to be operated by the worm $T^2$.

When it is desired to release the flanged plate from the die, the operator places his foot upon the pedal O. This causes the clutch P to be shifted and the shaft L' to be rotated in the opposite direction. This in turn causes the worm-shaft I and spindle F and former E to be lowered into the position shown in Fig. 3. The die D is also elevated, and the plate can then be withdrawn. The spindle at $F^2$ is made conical for the purpose of centering the plate B—that is, the opening in the plate B is the size of the cone $F^2$—and by elevating the spindle the plate B is brought properly into position for the flange $b$ to be formed thereon. The table C, and also the former E, the cone $F^2$, and the die D, are made detachable, so that when it is desirable to form a flange of different diameter, or when it is desired to renew any of these parts, they can be moved from their places and replaced, or others inserted in their places, respectively.

I claim—

1. In a flanging-machine, the combination of the former E, the eccentric-spindle F, the inverted-cup-shaped die D, vertically adjustable, and the beveled gear G, substantially as described.

2. The rotary spindle F, having the eccentric F', in combination with the former E, as described, guide $f^2$, and bearing $d$, substantially as set forth.

3. The combination, as described, of the rotating spindle having the eccentric F', the former E, the table C, and the die D.

4. The former E, loosely applied upon the eccentric-pin F', combined with the vertical spindle and an anti-friction bearing, substantially as described.

5. The combination of the gear G, the spindle F, having a feather, $f$, the hub $g'$, with the former E, loose upon the eccentric F', substantially as described.

6. The combination, as described, of the gear G, the spindle F, having the feather $f$, and the eccentric-pin F', and the former E.

7. The combination, as described, of the gear G, the gear J, the shaft I, having the worm I', the frame A, the spindle F, rotating on said shaft, and provided with an eccentric-pin, F', and a former, E, on this pin.

8. The combination, as described, of the frame A, the pedals N and O, the shafts K' L', and the gears $K^2$ $K^3$ $K^4$ $L^2$ $L^3$, and the clutch P.

9. The combination of the arm D', the removable hollow die D thereon, the removable centrally-perforated table C, and a former, which, by means of shaft F and pin F', receives vertical and eccentric movement, substantially as described.

10. The combination of the spindle F, having the eccentric F' and the conical portion $F^2$, with a former applied on said spindle, and a die, D, substantially as described.

11. The combination of the spindle F, having the extension $f^2$, with the die D, having the recess $d$, as and for the purposes described 12. The combination, as described, of the spindle F, having the eccentric F' and the extension $f^2$, with the former E, the table C, the die D, and the balls $e'$.

13. The combination of the former E, the spindle F, and the balls $e'$, the former and the support for the balls being grooved, for the purpose described.

14. The combination of the centrally-perforated table, a holding-die for the blanks, a cone, $F^2$, a rotary eccentric, and a former which is vertically removable from the spindle F, substantially as described.

Witness my hand.

H. W. SHEPARD.

Witnesses:
C. D. MOODY,
A. B. BOWMAN.